United States Patent [19]

Hashimoto

[11] Patent Number: 4,652,927
[45] Date of Patent: Mar. 24, 1987

[54] IMAGE SENSING DEVICE

[75] Inventor: Seiji Hashimoto, Kanagawa, Japan

[73] Assignee: Canon Kabushiki Kaisha, Tokyo, Japan

[21] Appl. No.: 556,706

[22] Filed: Nov. 30, 1983

[30] Foreign Application Priority Data

Nov. 30, 1982 [JP] Japan ............................... 57-210929

[51] Int. Cl.⁴ ............................................ H04N 3/15
[52] U.S. Cl. .................................................. 358/213
[58] Field of Search ............................... 358/213, 221

[56] References Cited

U.S. PATENT DOCUMENTS

| 4,293,877 | 10/1981 | Tsunekawa | 358/221 |
| 4,455,576 | 6/1984 | Hashimoto et al. | 358/213 |
| 4,498,105 | 2/1985 | Crawshaw | 358/221 |

FOREIGN PATENT DOCUMENTS

| 53-12361 | 10/1978 | Japan | 358/221 |
| 53-12571 | 11/1978 | Japan | 358/221 |

OTHER PUBLICATIONS

Chai, et al, "Noise Compensator . . . ", *IBM Tech. Disclosure Bull.*, vol. 16, No. 4, Sep. 73, p. 1099.

Primary Examiner—Gene Z. Rubinson
Assistant Examiner—L. Schroeder
Attorney, Agent, or Firm—Toren, McGeady and Goldberg

[57] ABSTRACT

An image sensing device permits stable black level control by including therein image sensor driving circuit arranged to form an idle read signal immediately after each line portion of output is produced from an image sensor. The device includes a circuit for holding the idle read signal during a horizontal blanking period. A clamping circuit is included for clamping the output of the holding circuit at a predetermined reference potential. Finally, a reference potential forming circuit is arranged to form a reference potential using the signal level of a light shielded part of the image sensor.

25 Claims, 5 Drawing Figures

IMAGE SENSING DEVICE

BACKGROUND OF THE INVENTION:

1. Field of the Invention

This invention relates to an image sensing device suited for obtaining an accurate black level.

2. Description of the Prior Art

Previously, in an apparatus such as a video camera of the type using a solid-state image sensor, a light shielded part was arranged at the image sensing cells corresponding to the back porch of the horizontal retrace line period. This was done for the purpose of obtaining a stable optical black reference signal during each horizontal retrace line period in clamping a signal read out. The reason for this arrangement was because the dark current which caused the black level fluctuations of the solid-state image sensor increased about twofold every time the temperature of the sensor rose 8° C. Further, the temperature range in which video cameras are used varies from −10° C. to +40° C. Therefore, several to scores of image sensing cells corresponding to back porches of the horizontal retrace lines within the solid-state image sensor are generally shielded from light to have dark currents solely produced there. The signal level of this part is then clamped at a reference black level. In order to have the clamping operation performed in a stable manner, it is preferable to allocate a large number of image sensing cells to the light shielded part. However, use of many image sensing cells for the light shielded part results in an insufficient number of image sensing cells in the horizontal direction. This in turn degrades resolution. It is difficult to increase the number of image sensing cells within a limited space unless the area and the integration degree of the image sensor are increased by improvement in process technology.

To solve this problem, a feedback type clamping method has generally been employed for a video camera using a camera tube. Consistent with this method, a system is arranged to include a clamping circuit which clamps the level of the beam blanking period at a reference level, i.e., black level. A processing circuit which amplifies the clamped signal and gamma corrects it. To stabilize the output of this system, the output of the processing circuit is compared with a predetermined reference level and a feedback process is arranged to negate any difference detected by this comparison. However, when this method is applied to a solid-state image sensing device, the device tends to be affected by a noise produced during the horizontal blanking period, because a solid-state image sensing device generally has a great deal of noise during the blanking period. In addition, a resetting action performed on the reference potential at the time of signal reading causes variations of the saturation resistance of a switching transistor. Further, the reset potential varies with the temperature characteristic. Therefore, it is impossible to include the blanking period as it exists in the signal to be clamped at the time such clamping occurs.

SUMMARY OF THE INVENTION

It is an object of the present invention to provide an image sensing device which is capable of eliminating the above-stated shortcomings of the prior art devices.

To eliminate the shortcomings of the prior art, when a solid-state image sensing device, for example, is used according to an embodiment of the invention, an artificial black level signal is obtained by carrying out idle signal reading at the front porch during the horizontal blanking period. This black level is sampled and held throughout the horizontal blanking period. With clamping carrier out in this manner, not only clamping operation but also feedback clamping can be performed with stability.

Further, in the embodiment of the invention, an error or difference of the artificial black level from an actual black level can be corrected by obtaining an optical black level at the back porch of the horizontal blanking period and by carrying out feedback clamping with this optical black level used as reference level. The invented arrangement always gives a stable black level.

These and further objects and features of the invention will become apparent from the following detailed description of a preferred embodiment thereof taken in conjunction with the accompanying drawings.

DETAILED DESCRIPTION OF PREFERRED EMBODIMENTS

Figure 1:
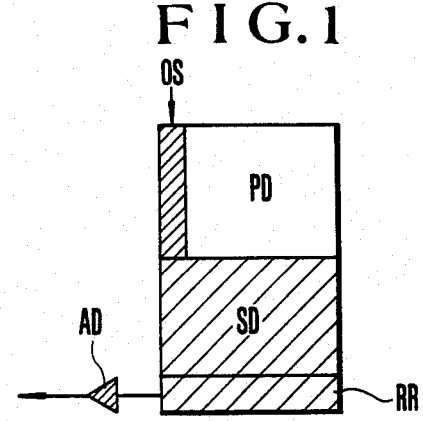
FIG. 1 is an illustration showing by way of example a CCD of the frame transfer type which is usable as image sensing means in accordance with the present invention.
Figure 2:
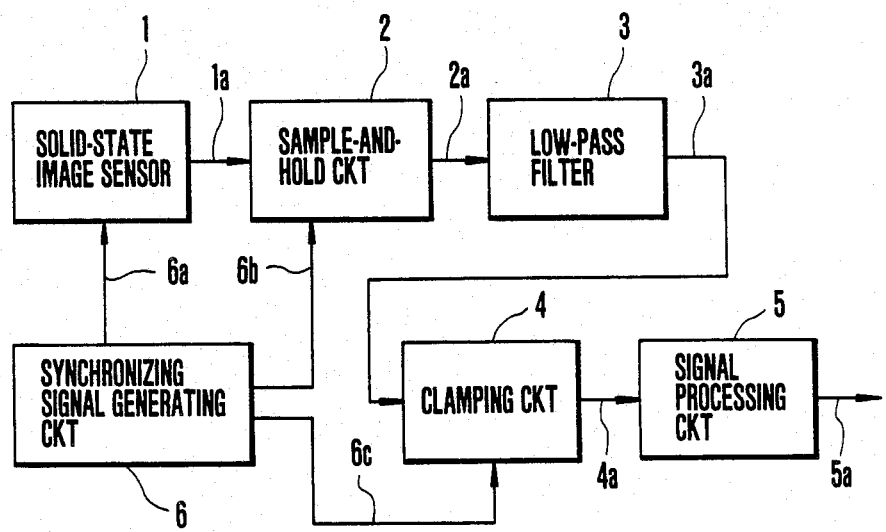
FIG. 2 is a block diagram showing by way of example a signal processing system.
Figure 3:
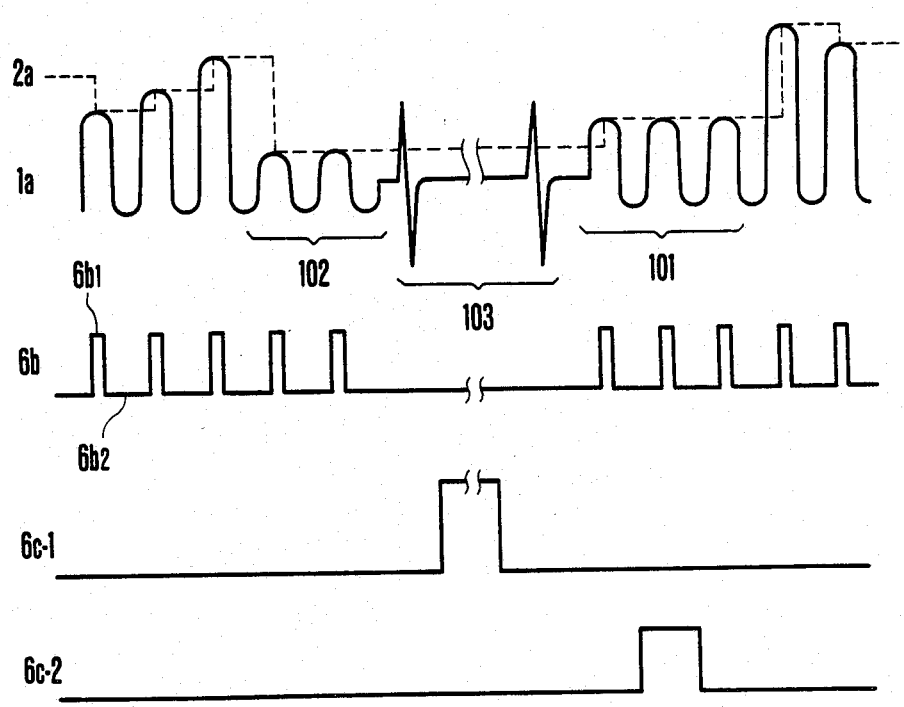
FIG. 3 is a wave form chart showing the operation of each component of the system of FIG. 2.
Figure 4:
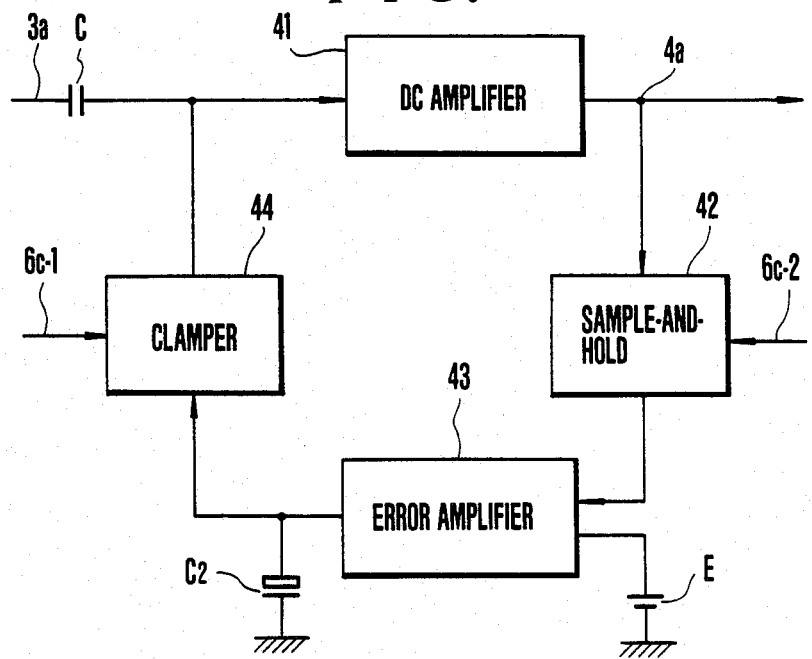
FIG. 4 is a block diagram showing by way of example a feedback type clamping circuit.

Embodiments of the present invention will be described below with reference to the accompanying drawings, in which: FIG. 1 shows an example of arrangement of a solid-state image sensor which is usable as an image sensor. FIG. 2 is a block diagram of a signal processing system according to the invention. FIG. 3 shows wave forms of the outputs produced from the components of the system of FIG. 2. FIG. 4 shows the specific arrangement of a clamping circuit.

As is well established, solid-state image sensors can be roughly classified into MOS and CCD types. In the specific embodiments herein given, a frame transfer type CCD is employed. An example of CCD of that type is shown in FIG. 1. As shown, the frame transfer type CCD comprises an image sensing part PD; a light shielded storage part SD; a light shielded read-out register RR; and an on-chip pre-amplifier AD. The image sensing part PD is provided with a light shielded part OS which performs a function corresponding to a reference signal at the time of signal clamping.

Referring to FIG. 2, the signal processing system includes the solid-state image sensor 1 which serves as image sensing means; a sample-and-hold circuit 2 which is arranged to serve as holding means according to the invention; a low-pass filter 3; a clamping circuit 4; a signal processing circuit 5; and a synchronizing signal generating circuit 6 which serves as signal generating means. Referring to FIG. 4, the clamping circuit 4 includes a DC amplifier 41; a sample-and-hold circuit 42; an error amplifier 43; and a clamper 44 which serve as clamping means. A reference potential forming means is formed jointly by the sample-and-hold circuit 42, the error amplifier 43, a capacitor C2 and a power source E.

With reference to the timing chart of FIG. 3, the embodiment arranged as described above operates as follows: The synchronizing signal generating circuit 6 which is arranged to serve as image sensor driving means produces driving pulses 6a as shown in FIG. 2. At the image sensing part PD of the solid-state image sensor 1 which is driven by the pulses 6a, photo-electrons are generated according to incident light and are accumulated, for example, for one field period by virtue of a potential well. Signal electric charges thus accumulated are parallel transferred to the storage part SD during a vertical blanking period. Then, during a next field period, electric charges are accumulated for the next field.

The signal electric charge of the storage part SD is transferred to the read-out register RR for one horizontal line at a time. First, the signal of cells in the light shielded part OS is read out. Following that, picture signal electric charges accumulated at the image sensing part PD are time sequentially read out one after another.

In accordance with the invention, an idle read signal is obtained by supplying redundant driving pulses even after one line portion of the signal of the image sensing part PD has been read out as shown in FIG. 3. This idle read signal contains a relatively small dark current component. However, it can be considered to be approximately equal to the dark current level of the light shielded part OS. A PAM (pulse amplitude modulation) signal which is obtained in this manner is schematically represented by a full line 1a in FIG. 3. In the PAM signal 1a, a portion 101 corresponds to the light shielded part OS, a portion 102 to an idle read period and a portion 103 to a horizontal blanking period. At the sample-and-hold circuit arranged in a subsequent state, this signal is transformed into a signal as represented by a broken line 2a in FIG. 3 by the sample-and-hold pulses 6b. In the sample-and-hold pulses 6b, each of portions 6b1 corresponds to a sampling state and each of portions 6b2 to a holding state. In other words, the signal level of the horizontal blanking period in which some noise other than the dark current component of the output of the image sensing cell encroaches is replaced with a signal which is to be clamped and which corresponds to the level of the idle read signal. This broken-line signal 2a is allowed to pass through the low-pass filter 3 which is arranged to use Nyquist frequency (½ of transfer frequency) as the cut-off frequency. The low-pass filter then produces a signal 3a. After that, the DC component of the signal 3a is reproduced at the clamping circuit 4. The clamping circuit 4 can be arranged, as shown in FIG. 4. Signal 3a which has passed through the low-pass filter 3 passes through a coupling capacitor C1. Then, signal 3a is clamped at a certain given potential via the clamper 44 which is driven by a clamping pulse 6c-1. It suffices that the clamping pulse 6c-1 is supplied during the idle read period (102) or the blanking period (103) of the signal 2a. The clamped signal thus obtained is supplied to the DC amplifier 41 and thus becomes an input signal 4a of the signal processing circuit 5 which consists of an encoder circuit, etc. In the signal 4a, a signal component corresponding to the light shielded part OS is sampled and held by the sample-and-hold circuit 42 which is driven by a sample-and-hold pulse 6c-2 shown in FIG. 3. Thus, an optical reference signal is detected. The detection signal thus obtained and a reference voltage E are compared and amplified at the error amplifier 43 to obtain a new clamping reference potential which includes a clamping error therein. This signal is supplied to the clamper 44 to have the picture signal 3a clamped in the direction of cancelling out the error component. As described above, the feedback type clamping circuit 4 according to the invention is arranged to stably operate in such a manner that the potential of the abovestated detection signal which corresponds to the light shielded part POS within the picture signal 3a is always kept at a predetermined potential. The picture signal 4a which has had its DC component reproduced at the clamping circuit 4 is signal processed into an NTSC signal 5a by the signal processing circuit 5.

In the described embodiment, a signal portion corresponding to the front porch of the horizontal retrace line period is obtained by idle read driving operation of the image sensing device. This signal is sampled and held to obtain an artificial black reference signal of a long period (i.e. a signal to be clamped) without necessitating any special modifications of the filter and the image sensing device. Accordingly, this permits use of a feedback type clamping circuit for stabilization of clamping In carrying out feed-back clamping, the clamping error is detected by using the output of the light shielded part OS of the image sensing device. This arrangement always gives accurate black level. Further, consistent with the invention, the light shielded part to be used for detection of the clamping error requires only several pieces of image sensing cells to permit effective use of the light receiving surface of the image sensing device. Besides, the resolution of the device will never be degraded. Clamping can be performed in a stable manner, inasmuch as almost the whole period of the horizontal retrace line can be used for the width of the clamping pulse to permit improvement in the following three points essential to the clamping circuit. They are: Improvement in hum, low zone transient distortion and horizontal period sagging.

While a frame transfer type CCD is employed as an example of image sensing device in the specific embodiment described, the invention is of course applicable also to other kinds of image sensing device such as an inter-line type CCD, an MOS type image sensor, a CPD (charge priming device), etc.

Figure 5:
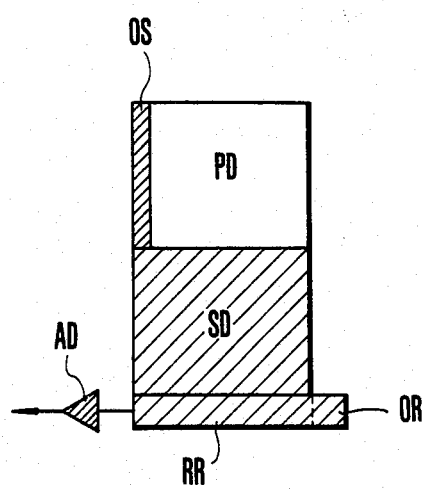
FIG. 5 is an illustration showing as another example the arrangement of the image sensing device according to the present invention.

Further, in the embodiment described, to form an idle read signal, a larger number of read-out pulses than the number of horizontal picture elements of the horizontal shift register RR are arranged to be supplied to the register RR for every horizontal period. However, this can be replaced with another method as shown in FIG. 5. Referring to FIG. 5 which shows another example of an image sensing device, in this case, the number of horizontal picture elements of the horizontal shift register RR is arranged to be larger than the number of the horizontal picture elements of the light receiving part PD and the storage part SD2; and an idle read signal is formed by reading out, at the end of each line, a signal from the redundant picture elements OR of the horizontal shift register RR not corresponding to the picture elements of the storage part SD2. The idle read signal which is obtained in this manner is sampled and held during the horizontal blanking period and a feed-back clamping process is applied thereto. Then, the black level of the light shielded part OS may then be detected by a sample-and-hold circuit disposed in that feedback clamping line.

What I claim:
1. An image sensing apparatus comprising:
   (a) sensing means for generating electrical signals corresponding to incident radiation, said sensing means including a radiation sensing part and a radiation insensitive part;
   (b) read out means for reading out said electrical signals;
   (c) holding means for holding those of the electrical signals read out by said read out means which are other than the electrical signals produced by said sensing means for a prescribed time;
   (d) reference signal forming means for forming a reference signal; and
   (e) clamping means for clamping said signal held by said holding means to a level such that said electrical signals generated at said radiation insensitive part takes the same level as that of said reference signal.

2. An image sensing apparatus of claim 1, further comprising driving means for driving said read out means, said driving means having a first mode in which driving is made to read out said electrical signals generated by said sensing means and a second mode in which said electrical signals generated by said sensing means is not read out but said read out means is driven, whereby said holding means holds the electrical signal read out when said driving means is in the second mode.

3. An image sensing apparatus of claim 1, wherein the prescribed time for which said holding means holds said signal is a time necessary for said clamping means to perform a clamping operation.

4. An image sensing apparatus of claim 1, wherein said clamping means includes:
   (a) means for latching said electrical signal generated at said radiation insensitive part;
   (b) comparing means for comparing said latched signal and said reference signal; and
   (c) a clamp circuit for clamping said signal held by said holding means to a level based on the result of comparison of said comparing means.

5. An image sensing apparatus of claim 4, wherein said clamp circuit includes:
   (a) memory means for memorizing the result of comparison of said comparing means; and
   (b) a clamper for clamping said signal held by said holding means based on the result of comparison memorized in said memory means.

6. An image sensing apparatus comprising:
   (a) sensing means for generating an electrical signal corresponding to incident radiation, said sensing means including a radiation sensing part and a radiation insensitive part;
   (b) transmitting means for transmitting an electrical signal, said transmitting means having a first mode to transmit the electrical signal of said sensing means and a second mode to transmit a signal other than the electrical signal of said sensing means;
   (c) holding means for holding a signal transmitted when said transmitting means is in the second mode for a prescribed time;
   (d) reference signal forming means for forming a reference signal; and
   (e) clamping means for clamping said signal held by said holding means to a level such that said electrical signal generated at said radiation shielding part takes the same level as that of said reference signal.

7. An image sensing apparatus of claim 6, wherein said radiation sensing part and said radiation insensitive part each is constructed with sensing elements, and said transmitting means includes:
   (a) a shift register having at least the same number of elements as that of said sensing elements;
   (b) first transfer means for transferring said electrical signal generated by said sensing means to said shift register; and
   (c) shift signal generating means for producing shift signals to cause said shift register to perform shift operations, whereby said first mode is a mode of said shift signal generating means in which shift operation is performed such that said electrical signal transferred by said first transfer means is outputted from said shift register, and said second mode is another mode of said shift signal generating means in which another shift operation is performed such that said electrical signal transferred by said first transfer means is not supplied as an output from said shift register.

8. An image sensing apparatus of claim 6, wherein said clamping means includes:
   (a) means for latching said electrical signal generated at said radiation insensitive part;
   (b) comparing means for comparing said latched signal and said reference signal; and
   (c) a clamp circuit for clamping said signal held by said holding means to a level based on the result of comparison of said comparing means.

9. An image sensing apparatus of claim 8, wherein said clamp circuit includes:
   (a) memory means for memorizing the result of comparison of said comparing means; and
   (b) a clamper for clamping said signal held by said holding means based on the result of comparison memorized in said memory means.

10. An image sensing apparatus of claim 6, wherein the prescribed time for which said holding means holds said signal is a time necessary for said clamping means to perform a clamping operation.

11. An image sensing apparatus of claim 7, wherein the time for which said holding means holds said signal is at least the time necessary for said first transfer means to perform the transfer operation.

12. An image sensing apparatus comprising:
   (a) sensing means for generating electrical signals corresponding to incident radiation, said sensing means including a radiation sensing part and a radiation insensitive part;
   (b) read out means for reading out said electrical signals;
   (c) means for driving said read out means to read out electrical signals other than the electrical signal generated by said sensing means;
   (d) reference signal forming means for forming a reference signal; and
   (e) clamping means for clamping the electrical signal read out from said read out means driven by said driving means to a level such that said electrical signal generated at said shielded part takes the same level as that of said reference signal.

13. An image sensing apparatus of claim 12, further comprising holding means for holding the electrical signal read out from said read out means driven by said driving means for a prescribed time necessary for said clamping means to perform a clamp operation.

14. An image sensing apparatus of claim 13, wherein said clamping means includes:
   (a) means for latching said electrical signal generated at said radiation shielding means;
   (b) comparing means for comparing said latched signal and said reference signal; and
   (c) a clamp circuit for the electrical signal read out from said read out means driven by said driving means to a level based on the result of comparison of said comparing means.

15. An image sensing apparatus of claim 14, wherein said clamp circuit includes:
   (a) memory means for memorizing the result of comparison of said comparing means; and
   (b) a clamper for clamping the electrical signal read out from said read out means driven by said driving means to a level based on the result of comparison memorized in said memory means.

16. An image sensing apparatus comprising:
   (a) sensing means for generating an electrical signal corresponding to incident radiation, said sensing means including a radiation sensing part and a radiation insensitive part;
   (b) read out means for reading out said electrical signal, said read out means having a blank feed driving mode to read out an electrical signal other than said electrical signal; and
   (c) clamping means for clamping the electrical signal read out in said blank feed driving mode to correspond to a level that said electrical signal generated at said radiation insensitive part.

17. An image sensing apparatus of claim 16, said clamping means includes:
   (a) reference signal forming means for forming a reference signal;
   (b) means for producing a difference signal corresponding to the difference between said electrical signal generated at said radiation insensitive part and said reference signal; and
   (c) a clamper for clamping the electrical signal read out in said blank feed driving mode to a level based on said difference signal.

18. An image sensing apparatus comprising:
   (a) image pickup means having a partly shielded image part and a read out part for reading out the signal generated in said image part and outputting a first signal generated at a shielded section of said image part, a second signal generated at an unshielded section of said image part and a third signal generated at the read out part;
   (b) clamping means for clamping said third signal to a reference level; and
   (c) reference level determination means for determining said reference level according to said second signal.

19. An image sensing apparatus of claim 18, wherein said reference level determination means includes:
   (a) second reference signal forming means for forming a second reference signal; and
   (b) means for generating said reference level from a signal corresponding to the difference between said second signal and said second reference signal.

20. An image sensing apparatus of claim 18, further comprising control means for driving said clamping means when said third signal is supplied as an output to said image pickup means.

21. An image sensing apparatus comprising:
   (a) sensing means for generating an electrical signal corresponding to incident radiation, said sensing means including a first generating part and a second generating part;
   (b) read-out means for reading out said electrical signal, said read-out means having a driving mode to read out an electrical signal other than said electrical signal; and
   (c) clamping means for clamping the electrical signal read out in said driving mode to correspond to a level that said electrical signal generated at said second part.

22. An image sensing apparatus of claim 21, wherein said first part is a radiation sensing part.

23. An image sensing apparatus of claim 21, wherein said second part is a radiation insensitive part.

24. An image sensing apparatus of claim 21, wherein said driving mode is a blank feeding mode.

25. An image sensing apparatus of claim 24, wherein said clamping means includes:
   (a) reference signal forming means for forming a reference signal;
   (b) means for producing a difference signal corresponding to the difference between said electrical signal generated at said radiation insensitive part and said reerence signal; and
   (c) a clamper for clamping the electrical signal read out in said blank feed driving mode to a level based on said difference signal.

* * * * *